Sept. 11, 1973  A. TRASK  3,758,368
AUTOMATIC AIR CONDITIONING SYSTEM
Filed Oct. 4, 1971
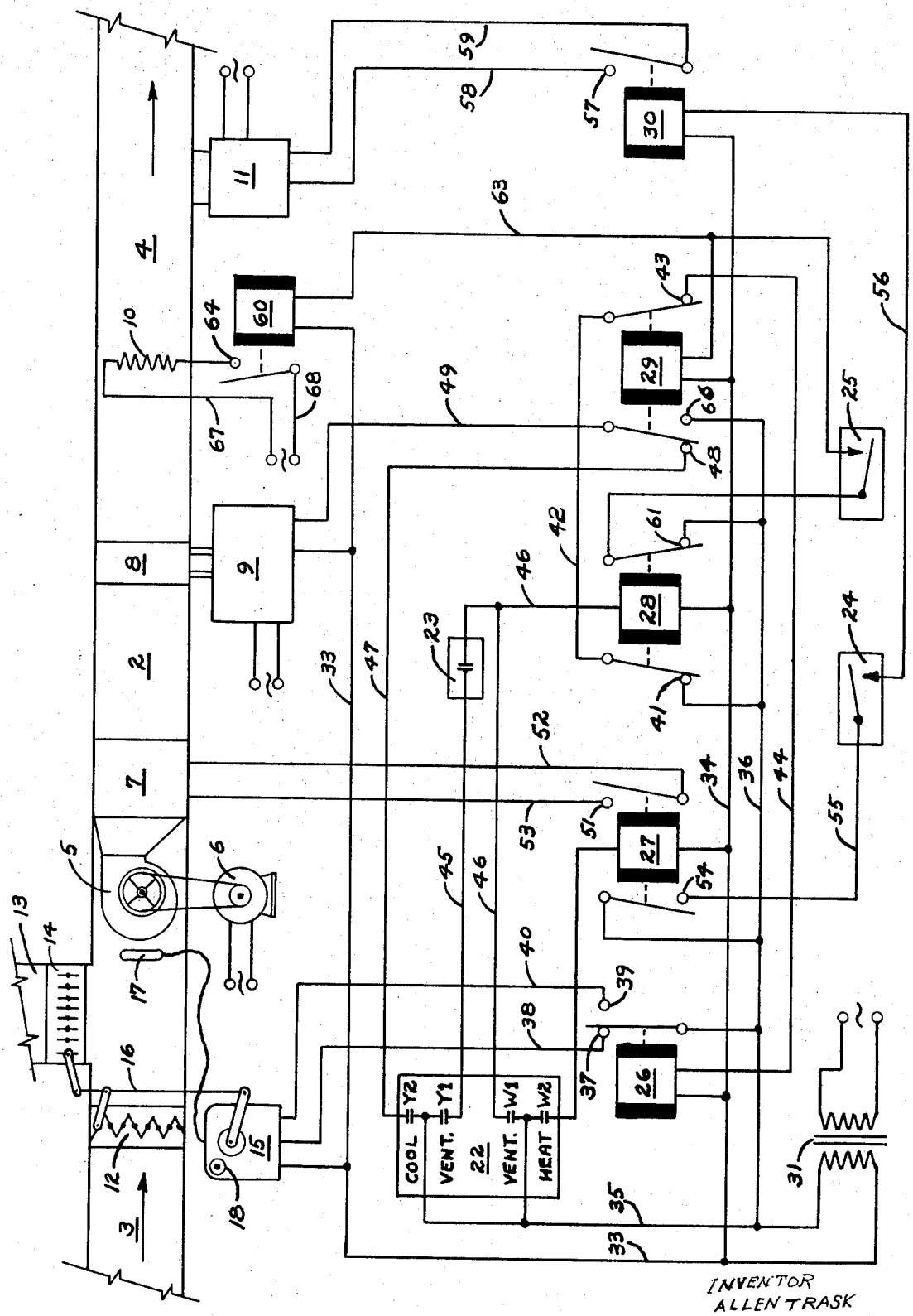
INVENTOR
ALLEN TRASK
BY M. R. Marsh
ATTORNEY

United States Patent Office

3,758,368
Patented Sept. 11, 1973

3,758,368
AUTOMATIC AIR CONDITIONING SYSTEM
Allen Trask, Utica, N.Y., assignor to The Mechaniwatt
Corporation, Utica, N.Y.
Filed Oct. 4, 1971, Ser. No. 186,312
Int. Cl. F24f 3/14
U.S. Cl. 165—21                     3 Claims

ABSTRACT OF THE DISCLOSURE

An air conditioning system wherein the functions of heating, cooling, humidifying, dehumidifying, ventilation, and natural cooling are automatically controlled during all types of weather by standard control instruments including an indoor 4-stage thermostat, an outdoor thermostat, and two humidistats, programmed in coordinated functional sequence through electrical control circuits and relays.

BACKGROUND OF THE INVENTION

For many years, manufacturers of air conditioning equipment have produced specialized units and components for heating, cooling, humidifying, dehumidifying, and fresh air ventilation. Manufacturers of controls produce thermostats, and humidistats for controlling separately the individual units of air conditioning equipment, each control having manual means for the setting and readjustment of its control point by an occupant of the air conditioned space who feels an adjustment of temperature, humidity or ventilation is necessary for eliminating a sensed discomfort.

The conventional heating-cooling thermostat in general use is in effect two thermostats, since its control function of heating or cooling must be selected personally and adjusted manually to either heating or cooling. This selection included a coincidental change in the set-point since the comfort set-point for cooling in summer is warmer than the set-point for heating during the winter season.

With the advent of the heat pump, a staging thermostat for automatic change-over between heating and cooling, having individual set-points for each, was introduced to the air conditioning industry. While the staging thermostat has been used almost exclusively for controlling heat pumps, it is adaptable and sometimes used for the change-over control of an air conditioning system including combustion heating combined with mechanical cooling equipment.

This invention discloses the potential capability of an indoor 4-stage thermostat for automatically controlling the introduction of outdoor air into the air conditioned space during the time the thermostat set-points for heating and cooling are saisfied in mild weather. It also discloses a novel and improved means for controlling natural cooling through the use of an outdoor thermostat controlling outdoor air introduction in conjunction with the indoor 4-stage thermostat.

In the background of this invention are two basic facts supporting the need for complete automatic control of air conditioning equipment to achieve the "total comfort" currently claimed by many manufacturers of air conditioning systems constructed to control heating, cooling, humidity, and ventilation. These two facts are:

(1) Air conditioning control instruments requiring weather compensating manual adjustments preordain discomfort, since discomfort is the prerequisite motivating the respective manual adjustments.

(2) An air conditioning system requiring manual adjustment of its control instruments cannot maintain comfort conditions in an unoccupied space since no occupant would be available to make the required manual adjustments to compensate for weather change during the time of no occupancy.

This invention includes improvements in the system disclosed in Pat. No. 3,352,352 relating to the types, assembly, functioning and coordination of the control instruments in an automatic air conditioning system.

SUMMARY OF THE INVENTION

This invention discloses improvements in an automatic air conditioning system, comprising equipment and control instruments for heating, cooling, humidity control, ventilation and natural cooling. The control instruments include a standard type 4-stage indoor thermostat for controlling temperature and ventilation, a single stage outdoor thermostat cooperating in the control of natural cooling, a humidistat for controlling the adding of humidity, and a humidistat for controlling the reduction of humidity during the time the temperature controlling stages of the 4-stage thermostat are satisfied.

Standard relays are used to integrate the above listed air conditioning functions in a permanently programmed sequence in accordance with the function chart following:

| Automatic function | Precedence | Functions permitted coincidentally | Functions locked out |
|---|---|---|---|
| Cooling | 1 | No other function | Heating, humidifying, ventilation. |
| Heating | 1 | Humidifying | Cool, dehumidifying, ventilation. |
| Dehumidifying | 2 | Electric reheat | Heat, humidifying, ventillation. |
| Humidifying | 3 | Heating | Cool, dehumidifying, ventillation. |
| Ventilation | 4 | None | Other functions are satisfied. |

The use of a 4-stage thermostat eliminates the need for more than one indoor thermostatic control unit for controlling heating, cooling, ventilation and natural cooling, and it simplifies the wiring of the complete control system. This invention discloses a novel control system for the introduction of the maximum amount of outdoor air ventilation, consistent with indoor comfort. When the outdoor air is cooler than the indoor air, it automatically provides natural cooling and thereby reduces the operating time for the mechanical cooling equipment during cool weather.

The use of an outdoor thermostat arranged to cooperate with the 4-stage indoor thermostat will extend the range of natural cooling control to achieve increased economy in system operation during cool weather. When the outdoor thermostat is set to open on temperature drop in the range of 70 degrees, it converts the cooling and ventilation control circuits for supplying outdoor air as the primary cooling source. The mechanical cooling equipment is then controlled to provide supplementary cooling to the outdoor air to limit the maximum indoor temperature to the cooling set-point on the 4-stage thermostat during the natural cooling process.

The drawing is a diagram of a complete automatic air conditioning system showing the individual units of air conditioning equipment in their functional sequence, and showing diagrammatically the control instruments and their control circuits in the condition of instrument satisfaction.

In the drawing, an air duct system 2 includes a return air duct 3 and a supply duct 4. A blower 5 operated by an alternating current blower motor 6 for constant air circulation is arranged to circulate air through the duct system 2. A gas furnace 7 is located downstream of blower 5 in the duct system 2. A cooling coil 8 is downstream of the gas furnace 7 and is operatively connected to the condensing unit 9. An electric heater 10 is located downstream of the cooling coil 8. A humidifier 11 is connected to the duct system 2 downstream of electric heater 10, and arranged for the introduction of water vapor into duct system 2.

A return air damper 12, within the return air duct 3, is arranged for opening and closing the return air duct, and an outdoor air duct 13 is arranged for the introduction of outdoor ventilation air into the duct system 2 downstream of return air damper 12. An outdoor air damper 14 is arranged for opening and closing the outdoor air duct 13. A damper motor 15 operates return air damper 12, and outdoor air damper 14 through damper linkage assembly 16, arranged for differential positioning of the dampers in the opposites phases of opening and closing so that when one damper is opening the other is closing. The combination of the outdoor damper 14, the return air damper 12, the damper motor 15, and the damper motor linkage 16, comprises ventilation means, whereby return air or outdoor air is mixed, or alternately moved through air duct system 2 in response to supervision by the indoor 4-stage thermostat 22.

The damper motor 15 may be one of three types:
(1) A two position motor (the damper open or closed), having a spring return mechanism for closing the damper;
(2) A two position motor requiring power for both opening and closing; or
(3) A modulating type motor arranged for modulated mixing of return air with ventilation air introduced through outdoor air damper 14. When damper motor 15 is of the modulating type, its modulation is controlled by thermal bulb 17, located downstream of outdoor air damper 14 in a position for sensing the temperature of mixed air combined in the convergence of return air through damper 12, with outdoor air introduced through damper 14. Mixed air temperature adjusting knob 18 is provided on the modulating type damper motor 15 for setting the mixed air temperature desired. The mixed air temperature setting of adjustment knob 18 is usually the system design temperature for supply air mechanically cooled between 55 and 60 degrees.

A conventional 4-stage thermostat 22 has a first thermal element controlling two thermally adjacent contacts arranged for closing on temperature rise, and a second thermal element controlling two thermally adjacent contacts arranged for closing on temperature drop. The first and second thermal elements are arranged for a positive and adjustable temperature differential therebetween, so that when one thermal element causes its contacts to close, the other thermal element is inherently prevented from closing its contacts.

The 4-stage thermostat 22 is located in the air conditioned space, and has a contact Y2 arranged to close on temperature rise at its cooling set-point selected to call for the operation of condensing unit 9, and contact W2 is arranged to close on temperature drop at its heating set-point selected to call for the operation of the gas furnace 7 at a temperature in the range of four to six degrees lower than the set-point of contact Y2. Thus a range of indoor temperature satisfaction is established between the settings of contacts Y2 and W2, wherein thermostat 22 does not call for the operation of either the gas furnace 7 or the condensing unit 9.

The ventilation means described hereinbefore is arranged for providing ventilation within the range of satisfaction between the set-points of contacts Y2 and W2 of thermostat 22. Contact Y1 is arranged to close on temperature rise in the range of one to two degrees below the temperature setting of contact Y2 and thereby stops the process of ventilation. Contact W1 is arranged to close on temperature drop in the range of one to two degrees above the temperature setting of contact W2 and thereby stops the process of ventilation.

An outdoor thermostat 23 is arranged to open in the range of 70 degrees on temperature drop to initiate and control natural cooling in conjunction with control by the 4-stage thermostat 22 through the introduction of outdoor ventilation air during outdoor air temperatures of 70 degrees and cooler.

The damper motor relay 26, when energized, is arranged to position damper motor 15 for maintaining the ventilation process during the time 4-stage thermostat 22 is satisfied, and the heating relay 27 is arranged to control the operation of gas furnace 7 by calling for heat when contact W2 of thermostat 22 is closed. A lockout relay 28 is arranged to stop ventilation and lockout the process of dehumidification in response to a call from the dehumidifying controller 25 during the time contact Y1 and W1 of thermostat 22 are closed.

The dehumidifying relay 29 is arranged to control the operation of condensing unit 9 and the simultaneous operation of electric heater 10 in response to a call for humidity reduction by humidistat 25 during the time thermostat 22 is satisfied. The humidifying relay 30 is arranged for operating humidifier 11 in response to calls for an increase of relative humidity in the air conditioned space by humidistat 24 during the time contact W2 of thermostat 22 is calling for heat.

OPERATION

A transformer 31, connected to an alternating current source, provides low voltage control current from its secondary winding through conductors 33, 34, 35 and 36 to the various conductor leads of the equipment, controls, and relays of the air conditioning system.

When the 4-stage thermostat 22 is satisfied, its 4 contacts Y1, Y2, W1, and W2 are open and damper motor 15 is energized by a circuit including conductor 35, the make contact 37 of relay 26, and conductor 33, to hold return air damper 12 closed, and outdoor air damper 14 open, through the damper linkage 16. Thus within the comfort zone of thermal satisfaction of the thermostat 22, the full air handling capacity of blower 5 is directed to drawing outdoor ventilation air through outdoor air duct 13 into air duct system 2, from which it is discharged by blower 5 into the air condition space through supply duct 4. An automatic damper, not shown, may be installed in a wall of the air conditioned space for exhausting excessive indoor air to reduce indoor air pressure.

When damper motor 15 is a two position, spring return type, it is arranged to open outdoor air damper 14 when energized as described above. When relay 26 is deenergized, it opens the circuit to the damper motor 15, whereupon the spring return mechanism of damper motor 15 returns the motor and damper control linkage 16 to its normal deenergized position wherein it maintains outdoor air damper 14 closed and return air damper 12 open.

When the damper motor 15 is a two position motor requiring power for both its opening cycle and its closing cycle to actuate the opening and closing of outdoor air damper 14 through damper linkage 16, it opens the damper through the energizing of conductor 38 as described above. When relay 26 is deenergized, its back contact 39 is closed to energize the closing cycle of damper motor 15 through conductor 40, to return the motor and the damper control linkage 16 to the position wherein outdoor air damper 14 is closed and return air damper 12 is open.

When damper motor 15 is a modulating type motor, it requires power for both its opening and closing cycles to be provided through relay 26 and the conductors described above, and for intermediate positioning of dampers 12 and 14, to provide a mixture of return air and outdoor air having the temperature selected and set on adjusting knob 18. The temperature setting of knob 18 is usually between 55 and 60 degrees at approximately the system design temperature for the cooled supply air during warm weather. Thus the mixed air function of the modulating damper motor is not called for unless the outdoor air temperature is colder than 55 degrees. The need for a modulating type damper motor is therefore restricted to air conditioning installations having exceptionally high internal heat gain requiring operation of a cooling function during outdoor temperature colder than 55 degrees.

During the time 4-stage thermostat 22 is satisfied with all its four contacts open, damper motor relay 26 is energized through a circuit including conductors 33, 34, 35, 36, 42 and 44, and back contacts 41 and 43 of lockout relay 28 and dehumidfying relay 29, respectively. This circuit is an important and distinguishing feature of this invention. It provides means for stopping the introduction of ventilation air into the duct system 2 by opening the above defined circuit when thermostat 22 calls for either heating or cooling, or when humidistat 25 calls for humidity reduction during the satisfaction of thermostat 22.

When the indoor temperature rises to close contact Y1 of thermostat 22, lockout relay 28 is energized by a circuit including conductors 33, 34 and 45, the normally closed contact of outdoor thermostat 23 and conductor 46. This opens the circuit to relay 26 at the back contact 41 of relay 28, and when relay 26 is deenergized the circuit to damper motor 15 is broken at its make contact 37. If damper motor 15 is a spring return type, it then opens return air damper 12, by the action of its spring return mechanism, and closes outdoor air damper 14 to shut off a flow of outdoor ventilation air into the air conditioned space. If damper motor 15 is a type requiring power return, its return cycle is powered through back contact 39 of relay 26 as explained hereinbefore.

When the indoor temperature rises further during warm weather, calling for mechanical cooling, contact Y2 of thermostat 22 cylecs condensing unit 9 on-and-off, as required to maintain the air conditioned space substantially at its cooling set-point while contact Y1 remains closed to keep outdoor air damper 14 closed to shut off ventilation, and return damper 12 open for recirculation of air from the air conditioned enclosure.

When the indoor temperature falls approximately 1½ degrees below the temperature set-point of cooling contact Y2, then contact Y1 opens and thermostat 22 becomes satisfied, whereupon outdoor air damper 14 opens and return air damper 12 closes to deliver approximately 100% outdoor ventilation air to the duct system 2, as hereinbefore explained.

By the above method of automatic control for natural cooling, the indoor 4-stage thermostat 22 provides full control during the time the outdoor air is cooler than the indoor air. The natural cooling control will continue until the indoor temperature falls to the set-point of contact W1, whereupon it will close to energize lockout relay 28 which, in turn, opens at its back contact 41 the circuit to relay 26. When relay 26 is deenergized, the circuit to damper motor 15 is broken at its make contact 37 to stop ventilation as hereinbefore explained.

When ventilation is stopped by the closing of contact W1 in response to a fall of indoor temperature, internal heat gain will increase the temperature of the recirculated indoor air. When the indoor air temperature rises to open contact W1, the operating circuit for relay 28 will be broken to restore the satisfied condition of thermostat 22, and the resulting full flow of outdoor re-ventilation air into the air conditioned space. The control function of contact W1 will cycle the flow of cool outdoor air on-and-off to use the full potential of internal heat gain for maintaining satisfaction of the heating contact W2. This results in the introduction of the maximum supply of ventilation air consistent with indoor comfort, and in a minimum use of mechanical cooling to gain economy in operating cost.

When the outdoor air temperature falls still further, and a corresponding drop in indoor temperature causes heating contact W2 to close, the heating relay 27 will be energized. When relay 27 is energized, its make contact 51 closes to complete a circuit between conductors 52 and 53, which are connected to the thermostat terminals of a conventional gas valve (not shown) inside gas furnace 7. The circuit thus established provides control of furnace 7 through contact W2 of thermostat 22, in the manner of conventional thermostatic control of heating equipment.

The foregoing automatic control of heating, cooling, and ventilation exclusively through the sensing and response of the indoor 4-stage thermostat 22 is satisfactory for low tonnage air conditioning systems in the range of 3–10 tons installed in residences and commercial applications, where the purchaser might wish to forego the cost of an outdoor thermostat and its installation. However, the addition of an outdoor thermostat 23 to function cooperatively with thermostat 22 will provide for a significant reduction in the operating time of condensing unit 9 through a more complete utilization of the natural cooling potential of cool outdoor air. Maximum benefits from the use of the outdoor thermostat may be gained in air conditioning systems encountering exceptionally high interval heat gain, such as in restaurants and cocktail lounges. An explanation of the functioning of outdoor thermostat follows.

During the condition of outdoor air temperature falling below the set-point of contact Y2, it is usual for the corresponding indoor temperature drop to lag behind the outdoor temperature drop. Under these conditions, outdoor air introduced into the air conditioned enclosure is cooler than the air temperature therein, and it therefore can contribute natural cooling to the enclosure even though the thermostat 22 may be calling for the operation of condensing unit 9.

In operation, the outdoor thermostat 23 may be set to open its contact on temperature drop at an outdoor temperature of 70 degrees. It is installed in series with contact Y1 of 4-stage thermostat 22 between conductors 45 and 46. When open, outdoor thermostat 23 causes damper motor 15 to remain energized for holding outdoor air damper 14 open for maximum ventilation just as through thermostat 22 was satisfied. During the time outdoor air is 70 degrees and cooler, it may not be cool enough to absorb the full internal heat gain to reduce the indoor temperature below the set-point of contact Y2. Under this condition, outdoor air will be introduced into air duct 2 as the primary cooling source, and contact Y2 will call for the operation of condensing unit 9 which will then provide supplementary cooling to the cool outdoor ventilation air being introduced.

During a continued fall of outdoor temperature, the mechanical cooling will be called for less and less until the natural cooling balances the internal heat gain at an indoor temperature cooler than the set-point of contact Y2, whereupon the thermostat 22 will remain satisfied while the natural cooling provided by the cool outdoor air will absorb the full cooling load.

In installations having exceptionally high internal heat gain, cooling is often called for when the outdoor air temperature is down to freezing temperatures. In these installations, the damper motor 15 is the modulating type controlled by thermal bulb 17, for mixing warm return air with cold outdoor air to produce supply air in the range of the temperature setting of control knob 18, as hereinbefore described.

During cool weather the relative humidity of the supply air may be increased in response to a call from humidistat 24 during the time contact W2 of thermostat 22 is calling for heat. Contact W2 energizes heating relay 27 through conductors 33, 34, 35 and 50. When heating relay 27 is energized, its make contact 54 closes to establish a circuit to humidistat 24 through conductor 55. When the humidistat calls for an increase of humidity, it closes its contact to energize humidifying relay 30 through conductors 33, 34, 35, 36, 55 and 56. When relay 30 is energized, its make contact 57 closes to complete a circuit between conductors 58 and 59, which are connected to humidistat control terminals (not shown) inside humidifier 11, whereupon the humidifier connected to a source of alternating current is operated to add water vapor to the air duct system 2.

During mild summer weather when thermostat 22 is satisfied and therefore calling for the introduction of outdoor ventilation air into air duct 2, the relative humidity of the ventilation air may exceed the permissible humidity percentage set on humdistat 25. When humidistat 25 closes its control to call for humidity reduction, it established a circuit to energized dehumidifying relay 29 and electric heater relay 60 through conductors 33, 34 35 and 36, back contact 61 of lockout relay 28 and conductors 62 and 63. When dehumidifying relay 29 is energized, its make contact 66 closes the control circuit to operate condensing unit 9 through conductors 9, 35, 36 and 49, and its back contact 43 opens to break the circuit through conductor 44 to relay 26, whereupon make contact 37 of relay 26 opens to stop ventilation as hereinbefore described.

The operation of condensing unit 9 lowers the temperature of cooling coil 8 to condense water vapor from the recirculated air through duct system 2. The energizing of electric heat relay 60 closes its make contact 65 to energize electric heater 10 through conductors 67 and 68 connected to a source of alternating current. The sequential cooling and reheating of air recirculated through duct system 2 reduces its relative humidity and provides supply air to the air conditioned space within the temperature zone of satisfaction in effect during the dehumidifying process.

While this invention has been shown in but one preferred embodiment thereof, it is obvious that various modifications may be made therein without departing from the principles and essential attributes thereof. For instance, semiconductor thermistors may be substituted for the set-point contacts of the 4-stage relay 22, and semiconductor components may be substituted for the electromechanical relays used. It is desired therefore that only such limitations be placed thereon as are specifically set forth in the appended claims.

What is claimed is:

1. In an air conditioning system for an enclosure, said system including means for heating, means for cooling, means for ventilation, means for circulating air within said enclosure, and means for controlling said air conditioning system, said controlling means incuding a 4-stage thermostat within said enclosure comprising a control circuit contact for each of its said four stages;

(1) a first contact closing on temperature rise establishing the set-point for controlling said cooling means;

(2) a second contact opening on temperature drop having its set-point at a temperature lower than the said set-point of said first contact, with a temperature differential therebetween, and arranged to permit the operation of said ventilation means when open, and to prevent the operation of said ventilation means when closed;

(3) a third contact closing on temperature drop establishing the set-point for controlling said heating means and arranged for establishing a temperature range of satisfaction between the said set-point of said first contact and the said set-point of said first contact and the said set-point of said third contact;

(4) a fourth contact opening on temperature rise having its set-point at a temperature differential above the said set-point of said third contact and arranged to pemit the operation of said ventilation means when open, and to prevent the operation of said ventilation means when closed.

3. An air conditioning system as claimed in claim 1, including an outdoor thermostat set to open on temperature drop at a temperature in the range of the set-point of said third contact and arranged in series with said second contact, whereby said ventilation means is maintained in operation during the time said outdoor thermostat is open and said fourth contact is open to permit natural cooling of said enclosure.

3. An air conditioning system as claimed in claim 1, including means for reducing the humidity within said enclosure, comprising a humidistat arranged to call for the operation of said humidity reducing means within the said range of temperature satisfaction set between the said set-points of said first contact and said third contact of said 4-stage thermostat.

References Cited

UNITED STATES PATENTS 2,171,803   9/1939   Parks et al. _____ 165—21

CHARLES SUKATO, Primary Examiner